United States Patent
Bachu et al.

(10) Patent No.: US 9,814,089 B2
(45) Date of Patent: Nov. 7, 2017

(54) SYSTEM TIMING-AWARE CO-EXISTENCE ON A SHARED COMMUNICATION MEDIUM

(71) Applicant: QUALCOMM Incorporated, San Diego, CA (US)

(72) Inventors: Raja Sekhar Bachu, Kendall Park, NJ (US); Rizwan Ehtesham Ahmed, Hillsborough, NJ (US); Prashanth Haridas Hande, Somerset, NJ (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 14/919,091

(22) Filed: Oct. 21, 2015

(65) Prior Publication Data

US 2016/0119971 A1 Apr. 28, 2016

Related U.S. Application Data

(60) Provisional application No. 62/068,268, filed on Oct. 24, 2014.

(51) Int. Cl.
| | | |
|---|---|---|
| *H04W 4/00* | (2009.01) | |
| *H04W 76/04* | (2009.01) | |
| *H04W 76/00* | (2009.01) | |
| *H04W 16/14* | (2009.01) | |

(Continued)

(52) U.S. Cl.
CPC ......... *H04W 76/048* (2013.01); *H04W 16/14* (2013.01); *H04W 76/00* (2013.01); *H04W 84/045* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,049,708 B2 | 6/2015 | Freda et al. | |
| 2007/0286080 A1* | 12/2007 | Kim | .................. H04W 52/0235 370/236 |

(Continued)

OTHER PUBLICATIONS

Almeida, E., et al., "Enabling LTE/WiFi Coexistence by LTE Blank Sub Frame Allocation," Communications (ICC), 2013 IEEE International Conference on, Jun. 9, 2013 (Jun. 9, 2013),—Jun. 13, 2013 (Jun. 13, 2013), pp. 5083-5088, XP002754020.

(Continued)

*Primary Examiner* — Minh-Trang Nguyen
(74) *Attorney, Agent, or Firm* — Muncy, Geissler, Olds & Lowe, P.C.

(57) ABSTRACT

Techniques for co-existence on a shared communication medium are disclosed. To foster co-existence, operation of a first Radio Access Technology (RAT) may be cycled between active periods and inactive periods of transmission, on a communication medium shared with a second RAT, in accordance with a Discontinuous Transmission (DTX) communication pattern. One or more cycling parameters of the DTX communication pattern may be set based on a frame structure associated with the first RAT. Transmission may proceed over the communication medium in accordance with the first RAT and the one or more cycling parameters of the DTX communication pattern.

28 Claims, 11 Drawing Sheets

(51) Int. Cl.
    *H04W 84/04*    (2009.01)
    *H04W 84/12*    (2009.01)

(56) References Cited

U.S. PATENT DOCUMENTS

| | | | |
|---|---|---|---|
| 2009/0180414 A1* | 7/2009 | Maeda | H04B 7/2643 370/311 |
| 2012/0327869 A1 | 12/2012 | Wang et al. | |
| 2013/0021992 A1* | 1/2013 | Marco | H04W 56/00 370/329 |
| 2013/0201884 A1* | 8/2013 | Freda | H04W 72/005 370/278 |
| 2014/0036882 A1* | 2/2014 | Baghel | H04B 1/1027 370/336 |
| 2015/0085683 A1 | 3/2015 | Sadek et al. | |
| 2015/0163825 A1 | 6/2015 | Sadek et al. | |
| 2015/0223243 A1 | 8/2015 | Tabet et al. | |
| 2015/0236782 A1 | 8/2015 | Kadous et al. | |
| 2015/0319701 A1* | 11/2015 | Ng | H04L 5/005 370/311 |

OTHER PUBLICATIONS

International Search Report and Written Opinion—PCT/US2015/056953—ISA/EPO—dated Feb. 22, 2016.

* cited by examiner

SYSTEM TIMING-AWARE CO-EXISTENCE ON A SHARED COMMUNICATION MEDIUM

CROSS-REFERENCE TO RELATED APPLICATIONS

The present Application for Patent claims the benefit of U.S. Provisional Application No. 62/068,268, entitled "System Timing-Aware Carrier Sense Adaptive Transmission in Unlicensed Spectrum," filed Oct. 24, 2014, assigned to the assignee hereof, and expressly incorporated herein by reference in its entirety.

INTRODUCTION

Aspects of this disclosure relate generally to telecommunications, and more particularly to co-existence on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

The following summary is an overview provided solely to aid in the description of various aspects of the disclosure and is provided solely for illustration of the aspects and not limitation thereof.

In one example, a communication method is disclosed. The method may include, for example, cycling operation of a first Radio Access Technology (RAT) between active periods and inactive periods of transmission, on a communication medium shared with a second RAT, in accordance with a Discontinuous Transmission (DTX) communication pattern; setting one or more cycling parameters of the DTX communication pattern based on a frame structure associated with the first RAT; and transmitting over the communication medium in accordance with the first RAT and the one or more cycling parameters of the DTX communication pattern.

In another example, a communication apparatus is disclosed. The apparatus may include, for example, at least one processor, at least one memory coupled to the at least one processor; and a transceiver. The at least one processor and the at least one memory may be configured to cycle operation of a first RAT between active periods and inactive periods of transmission, on a communication medium shared with a second RAT, in accordance with a DTX communication pattern, and set one or more cycling parameters of the DTX communication pattern based on a frame structure associated with the first RAT. The transceiver may be configured to transmit over the communication medium in accordance with the first RAT and the one or more cycling parameters of the DTX communication pattern.

In another example, another communication apparatus is disclosed. The apparatus may include, for example, means for cycling operation of a first RAT between active periods and inactive periods of transmission, on a communication medium shared with a second RAT, in accordance with a DTX communication pattern; means for setting one or more cycling parameters of the DTX communication pattern based on a frame structure associated with the first RAT; and means for transmitting over the communication medium in accordance with the first RAT and the one or more cycling parameters of the DTX communication pattern.

In another example, a transitory or non-transitory computer-readable medium is disclosed. The computer-readable medium may include, for example, code for cycling operation of a first RAT between active periods and inactive periods of transmission, on a communication medium shared with a second RAT, in accordance with a DTX communication pattern; code for setting one or more cycling parameters of the DTX communication pattern based on a frame structure associated with the first RAT; and code for transmitting over the communication medium in accordance with the first RAT and the one or more cycling parameters of the DTX communication pattern.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to co-existence techniques for operation on a shared communication medium. Access points implementing a Discontinuous Transmission (DTX) scheme may be configured to synchronize various aspects of their communication patterns and related measurement periods (e.g., for access terminal measurements, inter-RAT scanning, intra-RAT scanning, medium utilization scanning, etc.) with a frame structure of the primary RAT transmitting in accordance with the DTX scheme, such as the Long Term Evolution (LTE) System Frame Number (SFN) numerology. The use of a frame structure as a timing reference may provide more natural and efficient coordination with primary RAT operation than ad hoc signaling techniques and local synchronization operations such as NL-based coordination to be utilized as an alternative or in addition to absolute timing measurements (e.g., a Coordinated Universal Time or the like).

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
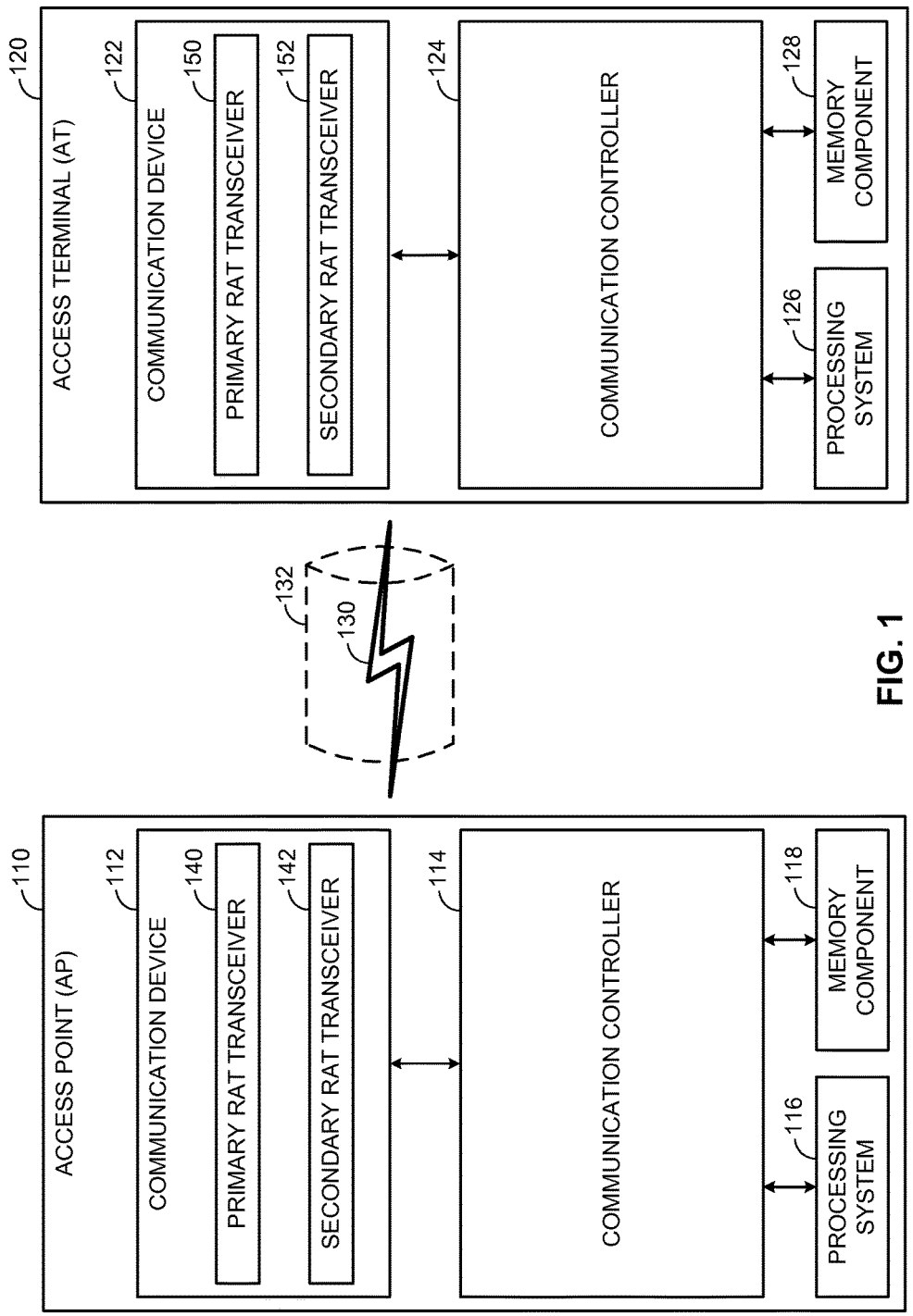
FIG. 1 illustrates an example wireless communication system including an access point in communication with an access terminal.

FIG. 1 illustrates an example wireless communication system including an access point in communication with an access terminal Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

In the example of FIG. 1, the access point 110 and the access terminal 120 each generally include a wireless communication device (represented by the communication devices 112 and 122) for communicating with other network nodes via at least one designated RAT. The communication devices 112 and 122 may be variously configured for transmitting and encoding signals (e.g., messages, indications, information, and so on), and, conversely, for receiving and decoding signals (e.g., messages, indications, information, pilots, and so on) in accordance with the designated RAT. The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may operate at the direction of or otherwise in conjunction with respective host system functionality (illustrated as the processing systems 116 and 126 and the memory components 118 and 128 coupled to the processing systems 116 and 126, respectively, and configured to store data, instructions, or a combination thereof, either as on-board cache memory, separate components, a combination, etc.). In some designs, the communication controllers 114 and 124 may be partly or wholly subsumed by the respective host system functionality.

Turning to the illustrated communication in more detail, the access terminal 120 may transmit and receive messages via a wireless link 130 with the access point 110, the message including information related to various types of communication (e.g., voice, data, multimedia services, associated control signaling, etc.). The wireless link 130 may operate as part of a cell, including Primary Cells (PCells) and Secondary Cells (SCells), on respective component carriers (respective frequencies). The wireless link 130 may operate over a communication medium of interest that includes the component carriers, shown by way of example in FIG. 1 as the communication medium 132, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the access point 110 and the access terminal 120 for the communication medium 132.

As an example, the communication medium 132 may correspond to at least a portion of an unlicensed frequency band shared with other RATs. In general, the access point 110 and the access terminal 120 may operate via the wireless link 130 according to one or more RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, in particular those employing small cell access points, have extended operation into unlicensed frequency bands such as the Unlicensed National Information Infrastructure (U-NII) band used by WLAN technologies, most notably IEEE 802.11x WLAN technologies generally referred to as "Wi-Fi."

Figure 2:
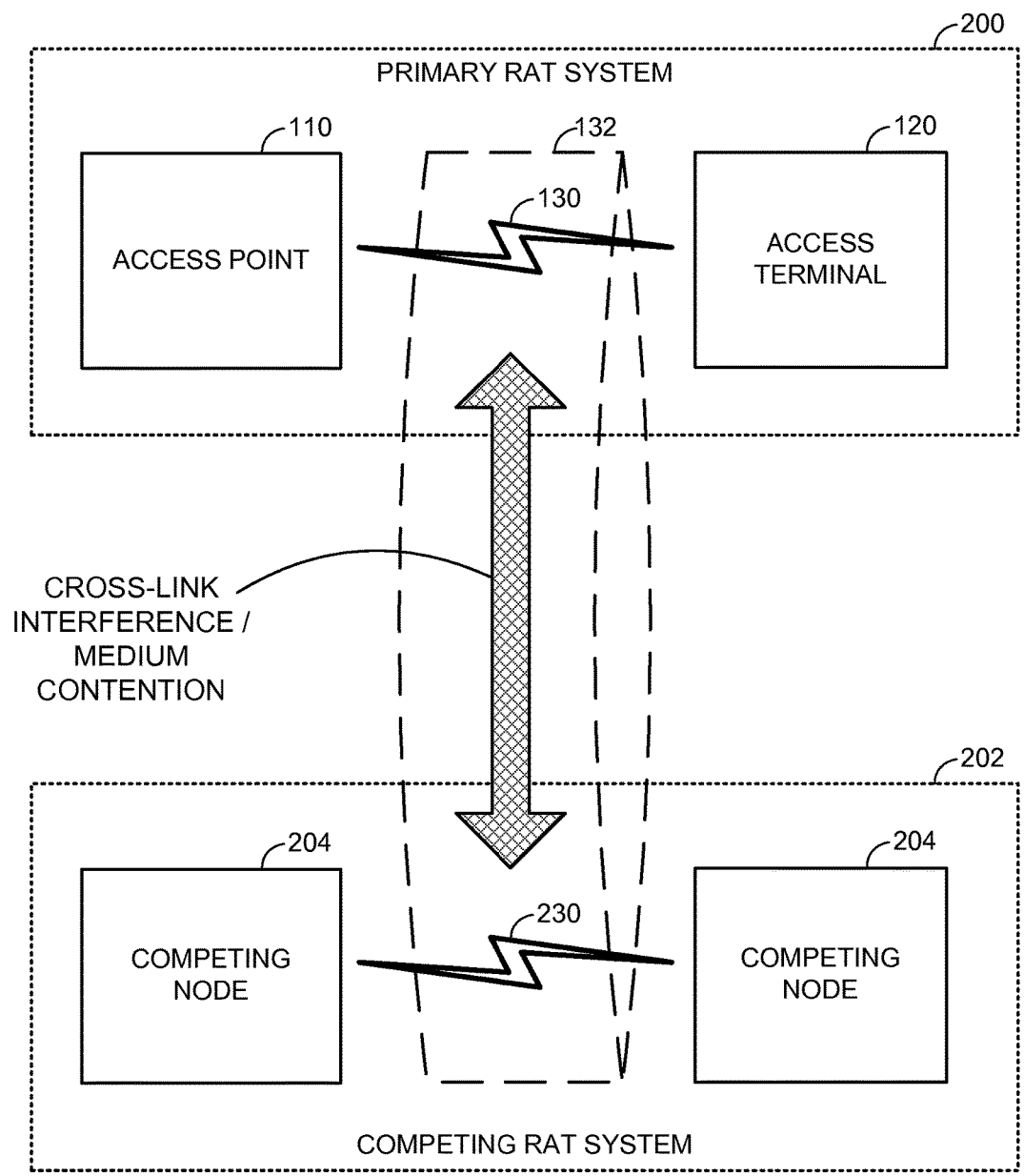
FIG. 2 is a system-level diagram illustrating contention between Radio Access Technologies (RATs) on a shared communication medium.

FIG. 2 is a system-level diagram illustrating contention between RATs on a shared communication medium such as the communication medium 132. In this example, the communication medium 132 is used for communication between the access point 110 and the access terminal 120 (representing at least part of a primary RAT system 200) and is shared with a competing RAT system 202. The competing RAT system 202 may include one or more competing nodes 204 that communicate with each other over a respective wireless link 230 also on the communication medium 132. As an example, the access point 110 and the access terminal 120 may communicate via the wireless link 130 in accordance with Long Term Evolution (LTE) technology, while the competing RAT system 202 may communicate via the wireless link 230 in accordance with Wi-Fi technology.

As shown, due to the shared use of the communication medium 132, there is the potential for cross-link interference between the wireless link 130 and the wireless link 230. Further, some RATs and some jurisdictions may require contention or "Listen Before Talk (LBT)" for access to the communication medium 132. As an example, the Wi-Fi IEEE 802.11 protocol family of standards provides a Carrier Sense Multiple Access/Collision Avoidance (CSMA/CA) protocol in which each Wi-Fi device verifies via medium sensing the absence of other traffic on a shared medium before seizing (and in some cases reserving) the medium for its own transmissions. As another example, the European Telecommunications Standards Institute (ETSI) mandates contention for all devices regardless of their RAT on certain communication mediums such as unlicensed frequency bands.

As described in more detail below, the access point 110 and/or the access terminal 120 may mitigate their interference to and from the competing RAT system 202 in different ways.

Returning to the example of FIG. 1, the communication device 112 of the access point 110 includes two co-located transceivers operating according to respective RATs, including a primary RAT transceiver 140 configured to operate in accordance with one RAT to predominantly communicate with the access terminal 120 and a secondary RAT transceiver 142 configured to operate in accordance with another RAT to predominantly interact with other RATs sharing the communication medium 132 such as the competing RAT system 202. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a W-Fi chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The primary RAT transceiver 140 and the secondary RAT transceiver 142 may accordingly provide different functionalities and may be used for different purposes. Returning to the LTE and Wi-Fi example above, the primary RAT transceiver 140 may operate in accordance with LTE technology to provide communication with the access terminal 120 on the wireless link 130, while the secondary-RAT transceiver 142 may operate in accordance with Wi-Fi technology to monitor or control Wi-Fi signaling on the communication medium 132 that may interfere with or be interfered with by the LTE communications. The secondary RAT transceiver 142 may or may not serve as a full W-Fi access point providing communication services to an associated Basic Service Set (BSS). The communication device 122 of the access terminal 120 may, in some designs, include similar primary RAT transceiver and/or secondary RAT transceiver functionality, as shown in FIG. 1 by way of the primary RAT transceiver 150 and the secondary RAT transceiver 152, although such dual-transceiver functionality may not be required.

Figure 3:
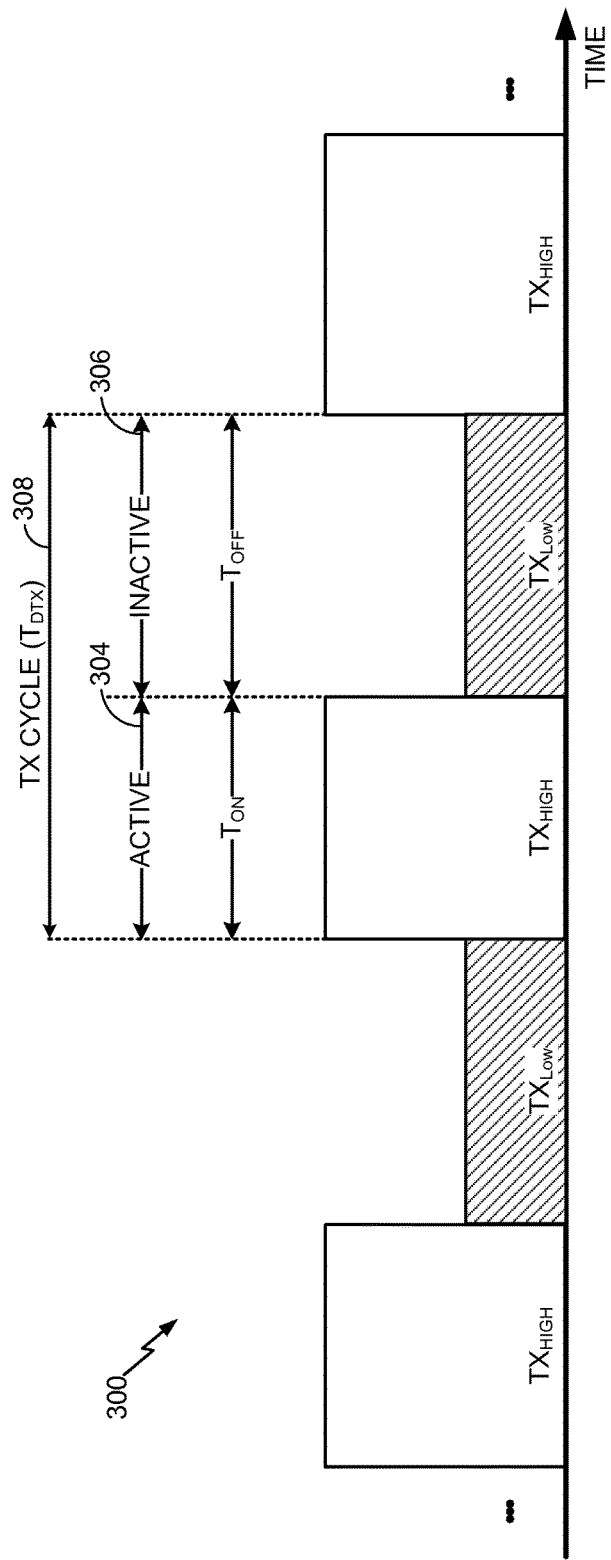
FIG. 3 illustrates certain aspects of an example Discontinuous Transmission (DTX) communication scheme.

FIG. 3 illustrates certain aspects of an example Discontinuous Transmission (DTX) communication scheme that may be implemented by the primary RAT system 200 on the communication medium 132. The DTX communication scheme may be used to foster time-division-based co-existence with the competing RAT system 202. As shown, usage of the communication medium 132 for primary RAT communication may be divided into a series of active periods 304 and inactive periods 306 of communication. The relationship between the active periods 304 and the inactive periods 306 may be adapted in different ways to promote fairness between the primary RAT system 200 and the competing RAT system 202.

A given active period 304/inactive period 306 pair may constitute a transmission (TX) cycle ($T_{DTX}$) 308, which collectively form a communication pattern 300. During a period of time $T_{ON}$ associated with each active period 304, primary RAT communication on the communication medium 132 may proceed at a normal, relatively high transmission power ($TX_{HIGH}$). During a period of time $T_{OFF}$ associated with each inactive period 306, however, primary RAT communication on the communication medium 132 may be disabled or at least sufficiently reduced to a relatively low transmission power ($TX_{LOW}$) in order to yield the communication medium 132 to the competing RAT system 202. During this time, various network listening functions and associated measurements may be performed by the access point 110 and/or the access terminal 120, such as medium utilization measurements, medium utilization assessment sensing, and so on.

The DTX communication scheme may be characterized by a set of one or more DTX parameters. Each of the associated DTX parameters, including, for example, a period duration (e.g., the length of $T_{DTX}$), a duty cycle (e.g., $T_{ON}/T_{DTX}$) and the respective transmission powers during active periods 304 and inactive periods 306 ($TX_{HIGH}$ and $TX_{LOW}$, respectively), may be adapted based on the current signaling conditions on the communication medium 132 to dynamically optimize the fairness of the DTX communication scheme.

With reference again to FIG. 1, the secondary RAT transceiver 142 may be configured to monitor the communication medium 132 during the time period $T_{OFF}$ for secondary RAT signaling, such as signaling from the competing RAT system 202, which may interfere with or be interfered with by primary RAT signaling over the communication medium 132. A utilization metric may then be determined that is associated with utilization of the communication medium 132 by the secondary RAT signaling. Based on the utilization metric, one or more of the associated parameters discussed above may be set and the primary RAT transceiver 140 may be configured to cycle between active periods 304 of communication and inactive periods 306 of communication over the communication medium 132 in accordance therewith.

As an example, if the utilization metric is high (e.g., above a threshold), one or more of the parameters may be adjusted such that usage of the communication medium 132 by the primary RAT transceiver 140 is reduced (e.g., via a decrease in the duty cycle or transmission power). Conversely, if the utilization metric is low (e.g., below a threshold), one or more of the parameters may be adjusted such that usage of the communication medium 132 by the primary RAT transceiver 140 is increased (e.g., via an increase in the duty cycle or transmission power).

As a further enhancement, various aspects of the DTX communication pattern 300 and related measurement periods may be synchronized with a frame structure associated with the primary RAT. An LTE System Frame Number (SFN) numerology is an example of a frame structure that may be employed when the primary RAT includes LTE technology. The use of a frame structure as a timing reference may provide more natural and efficient coordination with primary RAT operation than ad hoc signaling techniques. Further, it allows local synchronization operations such as Network Listen (NL) based coordination to be utilized as an alternative or in addition to absolute timing measurements (e.g., a Coordinated Universal Time or the like via a Global Navigation Satellite System (GNSS) such as the Global Positioning System (GPS)).

Figure 4:
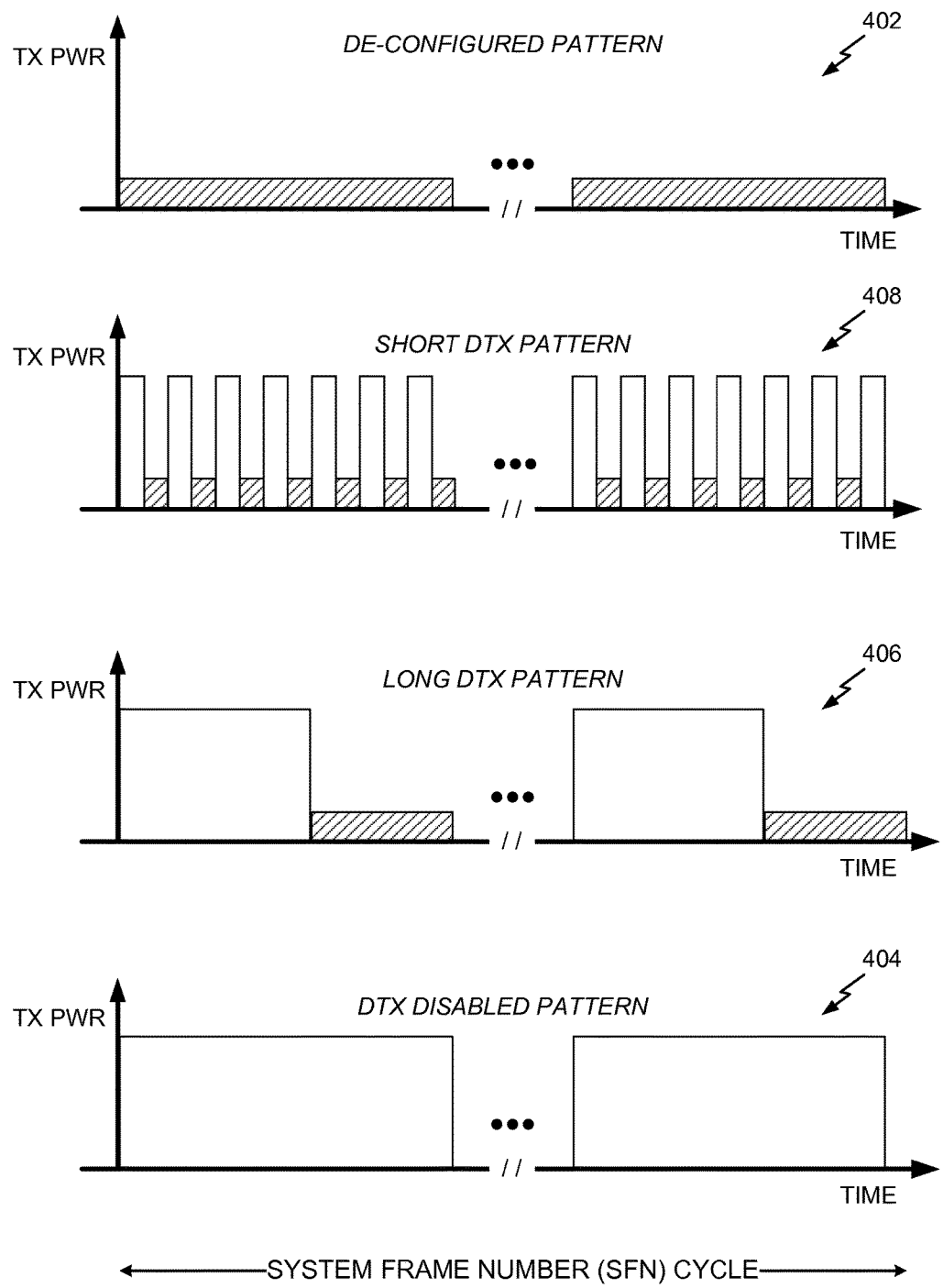
FIG. 4 illustrates an example nominal DTX communication pattern deployed in conjunction with a frame structure of the primary RAT.

FIG. 4 illustrates an example nominal DTX communication pattern deployed in conjunction with a frame structure of the primary RAT. As in FIG. 3, during the active periods 304 of communication, primary RAT transmission on the communication medium 132 is enabled. During the inactive periods 306, primary RAT transmission on the communication medium 132 is substantially disabled to allow for competing RAT operations, to conduct measurements, and so on. For illustration purposes, DTX communication is shown over one SFN cycle.

In this example, edge cases of a "de-configured" (normal cell OFF) communication pattern 402 and a configured but "DTX disabled" (normal cell ON) communication pattern 404 are shown for illustration purposes alongside two intermediary communication patterns corresponding to a relatively "long" DTX communication pattern 406 and a relatively "short" DTX communication pattern 408. As shown, the long DTX communication pattern 406 is characterized by a longer DTX cycle ($T_{DTX}$) as compared to the short DTX communication pattern 408. In general, a longer DTX cycle with extended but less frequent transmission gaps provided by the inactive periods 306 may be better suited to accommodate exposed nodes of the competing RAT system 202 (e.g., nearby Wi-Fi APs). Conversely, a short DTX cycle with compact but more frequent transmission gaps provided by the inactive periods 306 may be better suited to accommodate hidden nodes of the competing RAT system 202 (e.g., out-of-range Wi-Fi STAs).

The access point 110 may select the appropriate communication pattern to use for its primary RAT transmission in different ways. For example, the de-configured communication pattern 402 may be used, for example, when other cells (e.g., a PCell) are sufficient for meeting the current traffic needs of the access terminal 120 (e.g., without the need for an additional SCell to be configured). The DTX disabled communication pattern 404 may be used, for example, when the competing nodes 204 of the competing RAT system 202, if any, are operating with a relatively low received power (e.g., less than −82 dBm). The long DTX communication pattern 406 may be used, for example, when the competing nodes 204 of the competing RAT system 202 are operating with a moderate received power (e.g., between −82 dBm and −62 dBm). The short DTX communication pattern 408 may be used, for example, when the competing nodes 204 of the competing RAT system 202 are operating with a relatively high received power (e.g., above −62 dBm).

As is further illustrated in FIG. 4, each of the DTX communication patterns may be synchronized with a desired frame structure such as the LTE SFN numerology shown by way of example. An LTE System Frame (SF) is generally divided into 1024 numbered Radio Frames (RFs), which together constitute an SFN cycle (e.g., lasting 10.24 s for 10 ms RFs). DTX cycling parameters such as the period duration (e.g., the length of $T_{DTX}$) and the nominal duty cycle (e.g., $T_{ON}/T_{DTX}$) may be aligned and adapted to fit within the framework of each SFN cycle. As an example for the long DTX communication pattern 406 within the illustrated frame structure, the DTX period duration parameter ($T_{DTX}$) may be set to 640 ms with a nominal DTX duty cycle ($T_{ON}/T_{DTX}$) of 0.5 (i.e., a 320 ms active period 304 and a 320 ms inactive period 306), although it will be appreciated that other parameter configurations fitting the SFN cycle may be used for other long DTX communication pattern implementations. As an example for the short DTX communication pattern 408 within the illustrated frame structure, the DTX period duration parameter ($T_{DTX}$) may be set to 80 ms with a nominal DTX duty cycle ($T_{ON}/T_{DTX}$) of 0.5 (i.e., a 40 ms active period 304 and a 40 ms inactive period 306), although it will again be appreciated that other parameter configurations fitting the SFN cycle may be used for other short DTX communication pattern implementations. Major state transitions (e.g., SCell configuration/de-configuration) may then take place at SFN cycle boundaries, while minor state transitions (e.g., DTX duty cycle changes) may take place at other, intra-cycle boundaries, such as the boundaries of long DTX cycles.

It will therefore be appreciated that the present disclosure provides not only for adapting one or more cycling parameters of a DTX communication pattern (e.g., based on utilization by another RAT), but doing so based on a frame structure associated with the primary RAT itself.

FIGS. 5-8 below illustrate modifications to the nominal DTX timing structure of FIG. 4 at predefined locations for coordinating various signaling measurement opportunities within the framework of each SFN cycle. In the discussion that follows, it will be appreciated that specific examples may be given for the location and duration of each of these opportunities but that these examples are provided for illustration purposes only and may be modified as needed to satisfy different application-specific requirements.

Figure 5:
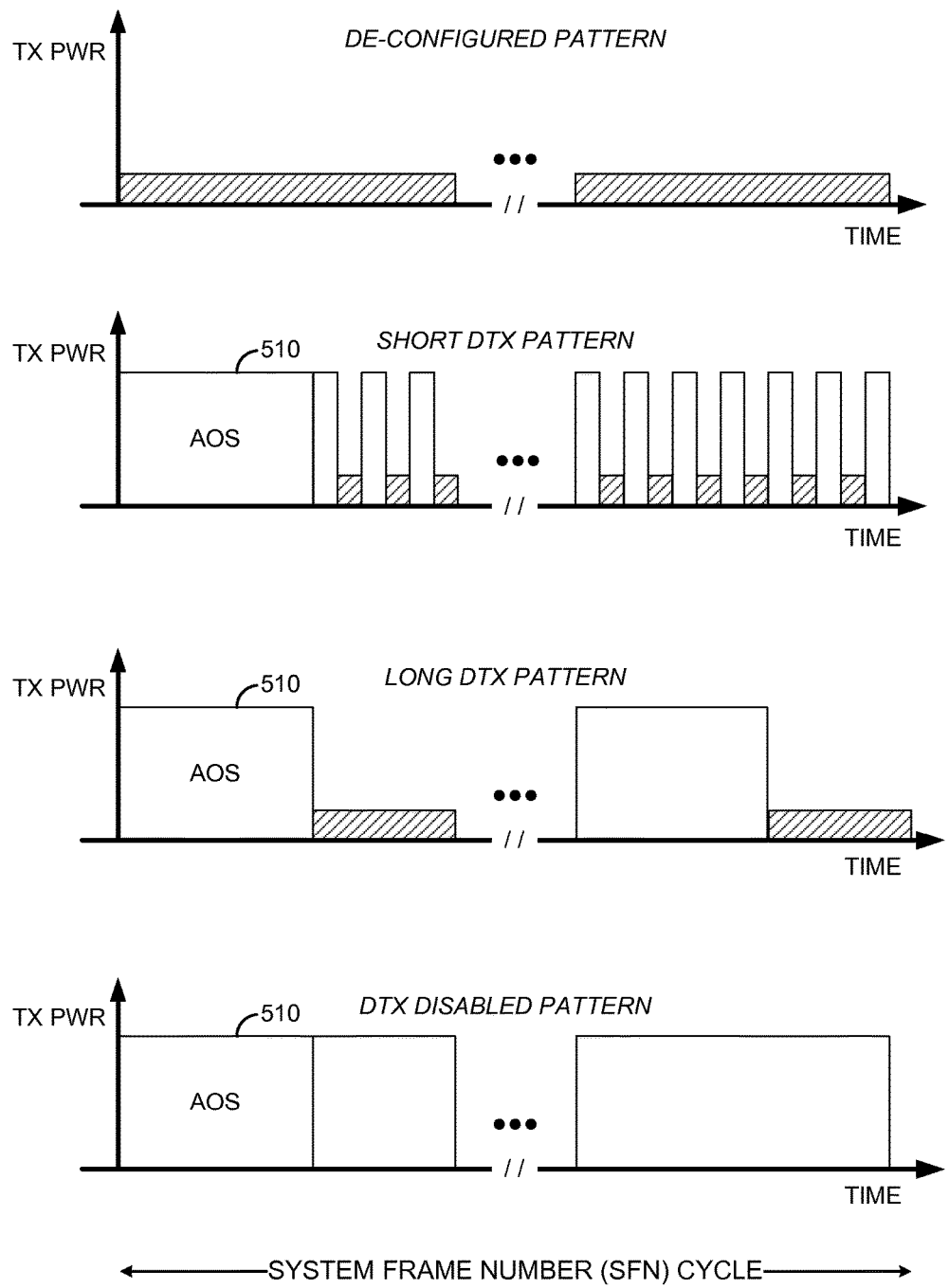
FIG. 5 illustrates an example DTX timing structure adapted to coordinate access terminal measurement opportunities within a frame structure of the primary RAT.

FIG. 5 illustrates an example DTX timing structure adapted to coordinate access terminal measurement opportunities within a frame structure of the primary RAT, which is again shown for illustration purposes with respect to one cycle of an LTE SFN numerology. In this example, measurement opportunities are provided for the access terminal 120 to perform Radio Resource Management (RRM) measurements (e.g., Reference Signal Received Power (RSRP)/Reference Signal Received Quality: (RSRQ)) and the like, which may be used for channel (e.g., SCell) selection scanning in addition to conventional access terminal functionality. As shown, the DTX timing structure of FIG. 4 may be modified to further include an Always-On-State (AOS) period 510 reserved for such access terminal measurements (e.g., at the start of an SFN cycle). During each AOS period 510, the access point 110 may continue to transmit such that DTX operation is effectively unenforced.

Figure 6:
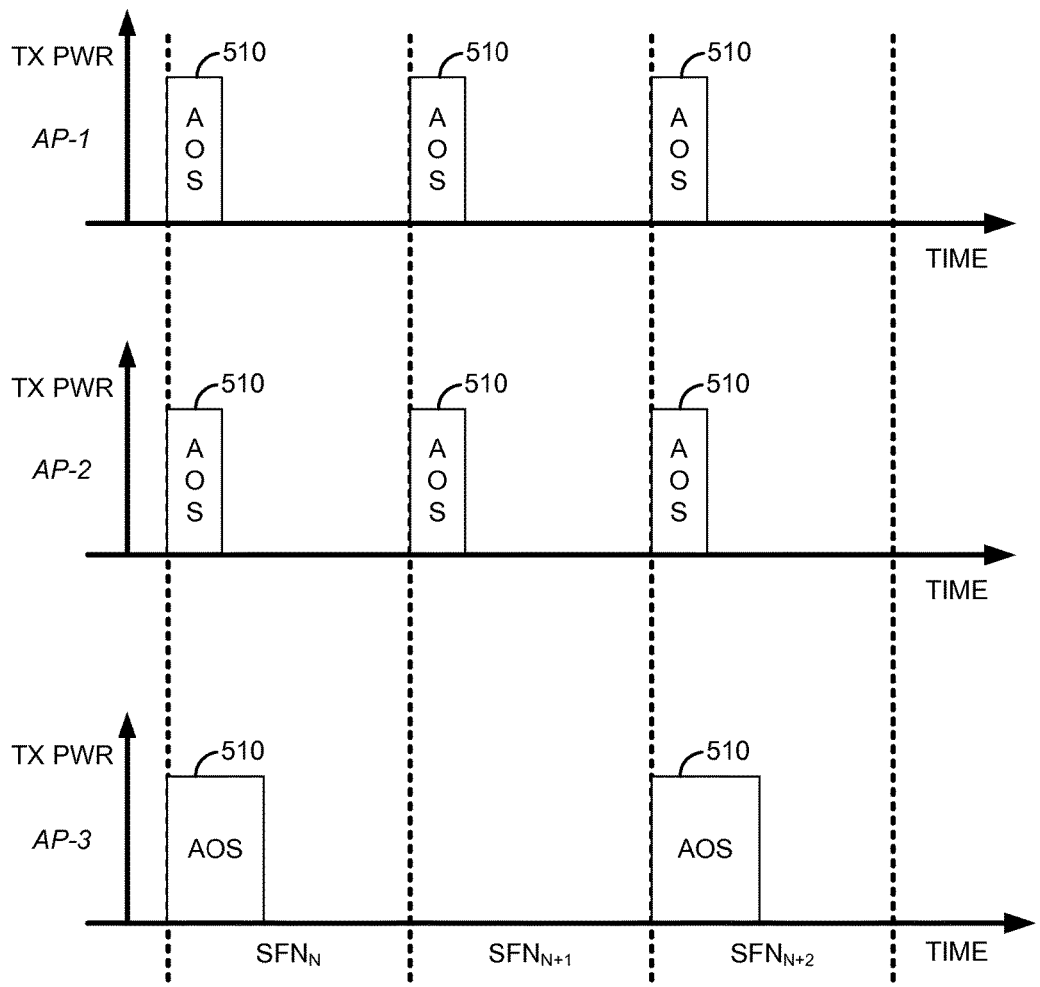
FIG. 6 is a timing diagram illustrating Always-On-State (AOS) period coordination across different access points.

FIG. 6 is a timing diagram illustrating AOS period coordination across different access points. For illustration purposes, the access point 110 (AP-1) is shown as part of a larger neighborhood that includes other access points (AP-2 and AP-3) operating in accordance with a similar frame structure over three example SFN cycles ($SFN_N$, $SFN_{N+1}$, and $SFN_{N+2}$). As an example, the access points may be provided by the same operator.

A consistent cycle-to-cycle timing for the AOS period 510 as shown for the first and second access points (AP-1 and AP-2) may be beneficial in several ways. For example, it may help make local system synchronization (e.g., NL-based synchronization) sufficient to coordinate access terminal measurement opportunities across different access points. However, if a substantially long AOS period duration is required, it may be advantageous to stagger the AOS period 510 over several SFN cycles as shown for the third access point (AP-3). For example, for a relatively short AOS duration of 320 ms, the AOS period 510 may be repeated every SFN cycle. For a relatively long AOS duration of 1.28 s, however, the AOS period 510 may be repeated every sixth SFN cycle. For staggered AOS period implementations, absolute synchronization (e.g., via GNSS or the like) may be used to enforce the start of each SFN cycle provisioned with an AOS period and thereby coordinate AOS period timing.

Figure 7:
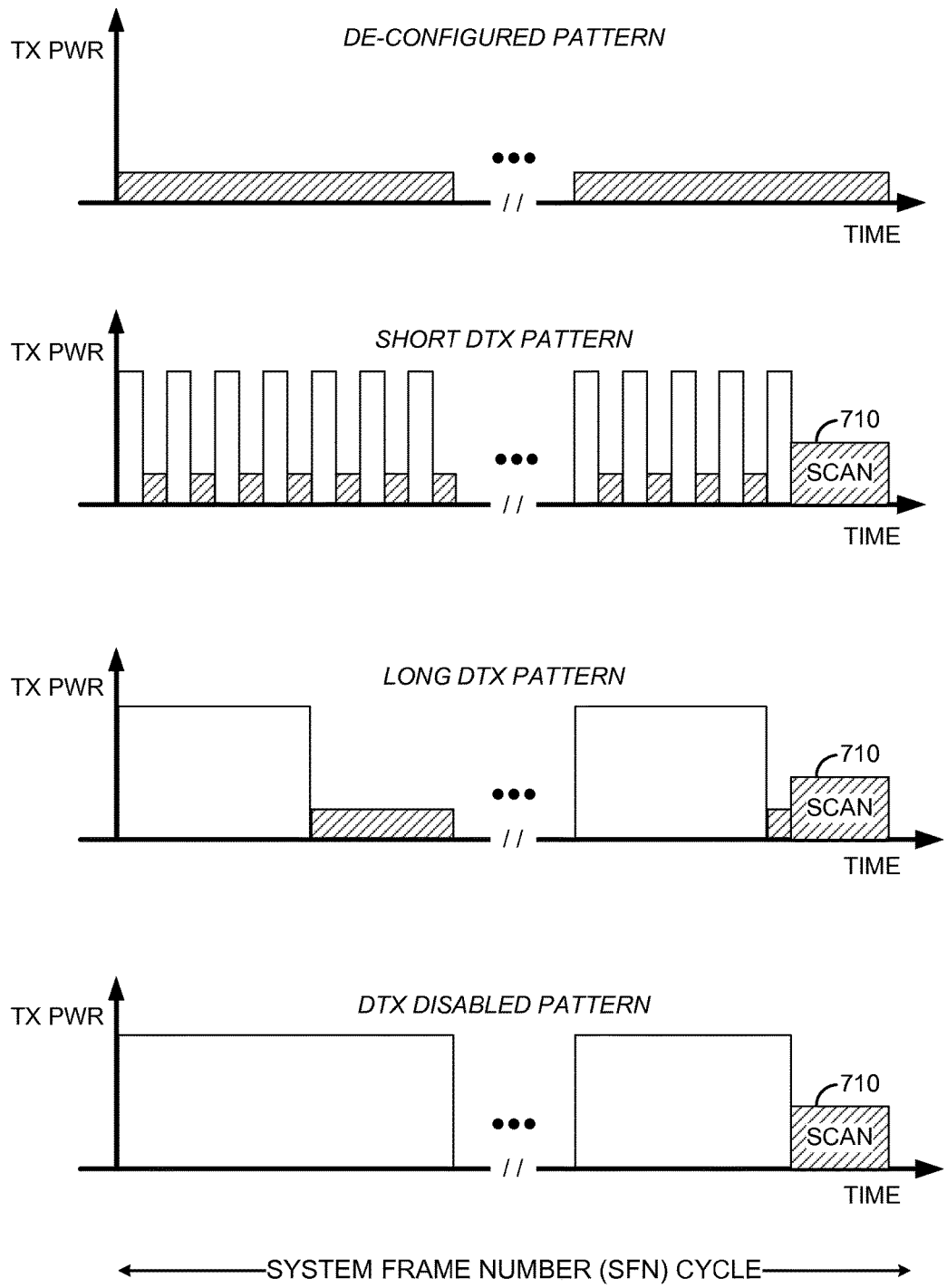
FIG. 7 illustrates an example DTX timing structure adapted to coordinate inter-RAT scanning opportunities within a frame structure of the primary RAT.

FIG. 7 illustrates an example DTX timing structure adapted to coordinate inter-RAT scanning opportunities within a frame structure of the primary RAT, which is again shown for illustration purposes with respect to one cycle of an LTE SFN numerology. In this example, measurement opportunities are provided for scanning of the competing RAT system 202 and the like (e.g., Wi-Fi AP scanning), which may be used for channel selection, opportunistic supplemental downlink, and so on. As shown, the DTX timing structure of FIG. 4 may be modified to further include a scan period 710 reserved for such scanning measurements (e.g., a 160 ms duration at the end of each SFN cycle to facilitate channel selection for the next SFN cycle). During each scan period 710, the access point 110 may refrain from transmitting to allow co-channel measurements (e.g., by the secondary RAT transceiver 142).

Figure 8:
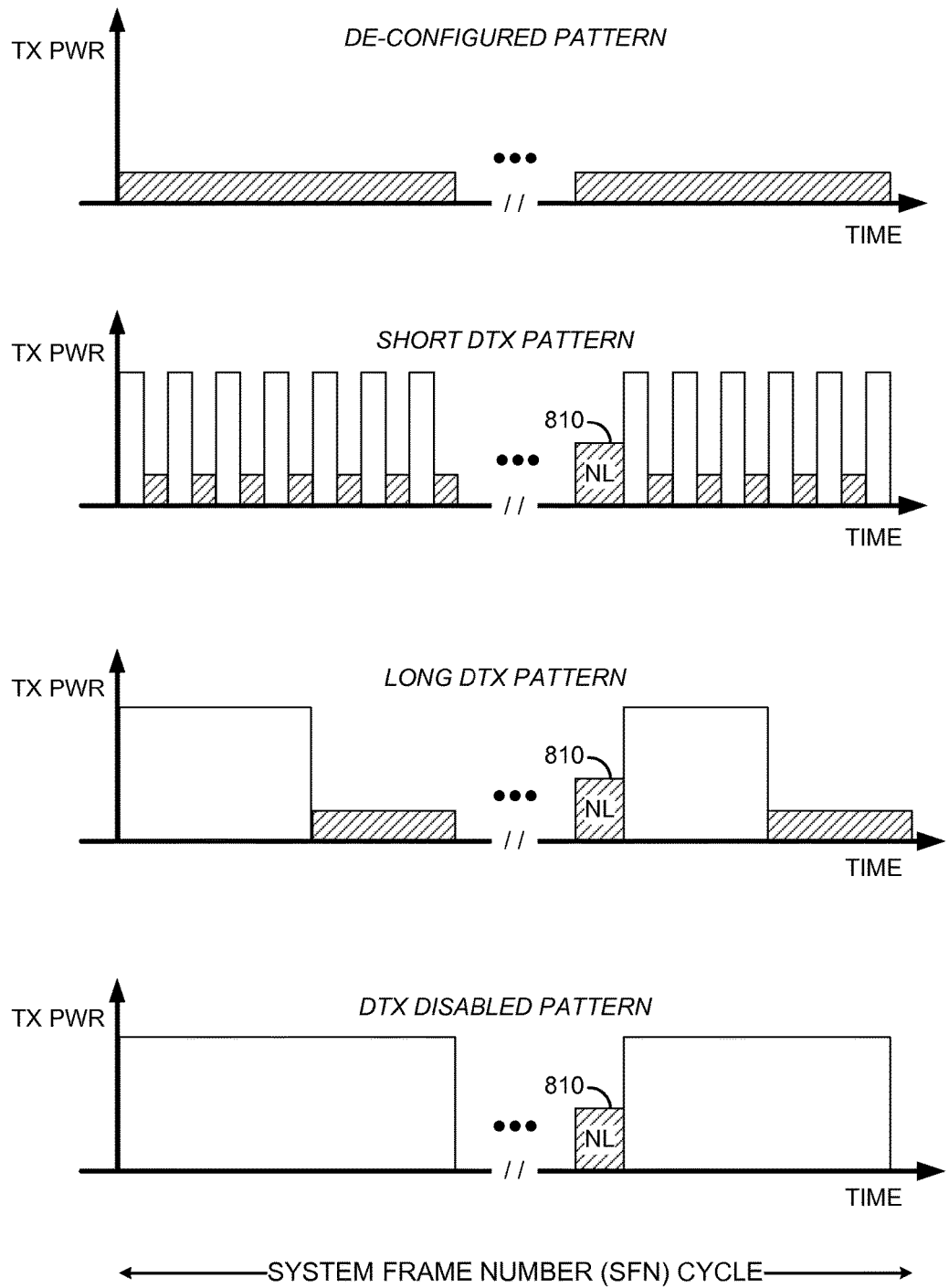
FIG. 8 illustrates an example DTX timing structure adapted to coordinate intra-RAT Network Listen (NL) scanning opportunities within a frame structure of the primary RAT.

FIG. 8 illustrates an example DTX timing structure adapted to coordinate intra-RAT NL scanning opportunities within a frame structure of the primary RAT, which is again shown for illustration purposes with respect to one cycle of an LTE SFN numerology. In this example, measurement opportunities are provided for primary RAT NL scanning and the like (e.g., LTE NL scanning), which may be used for channel selection and opportunistic supplemental downlink in addition to conventional access point functionality. As shown, the DTX timing structure of FIG. 4 may be modified to further include an NL scan period 810 reserved for such intra-RAT NL measurements (e.g., a 40 ms duration at the beginning of each DTX cycle). During each NL scan period 810, the access point 110 may refrain from transmitting to allow co-channel measurements (e.g., by the primary RAT transceiver 140). Because DTX cycling is generally not coordinated across access points even for coordinated SFN timing, primary RAT signaling from neighboring access points will in general still be available during this time for the NL measurements. Further, not all NL scan periods 810 will be used by all access points. If not needed, the access point 110, for example, may operate normally in conjunction with its DTX cycling parameters (providing primary RAT signaling for other access points to measure during a given NL Scan period 810).

Figure 9:
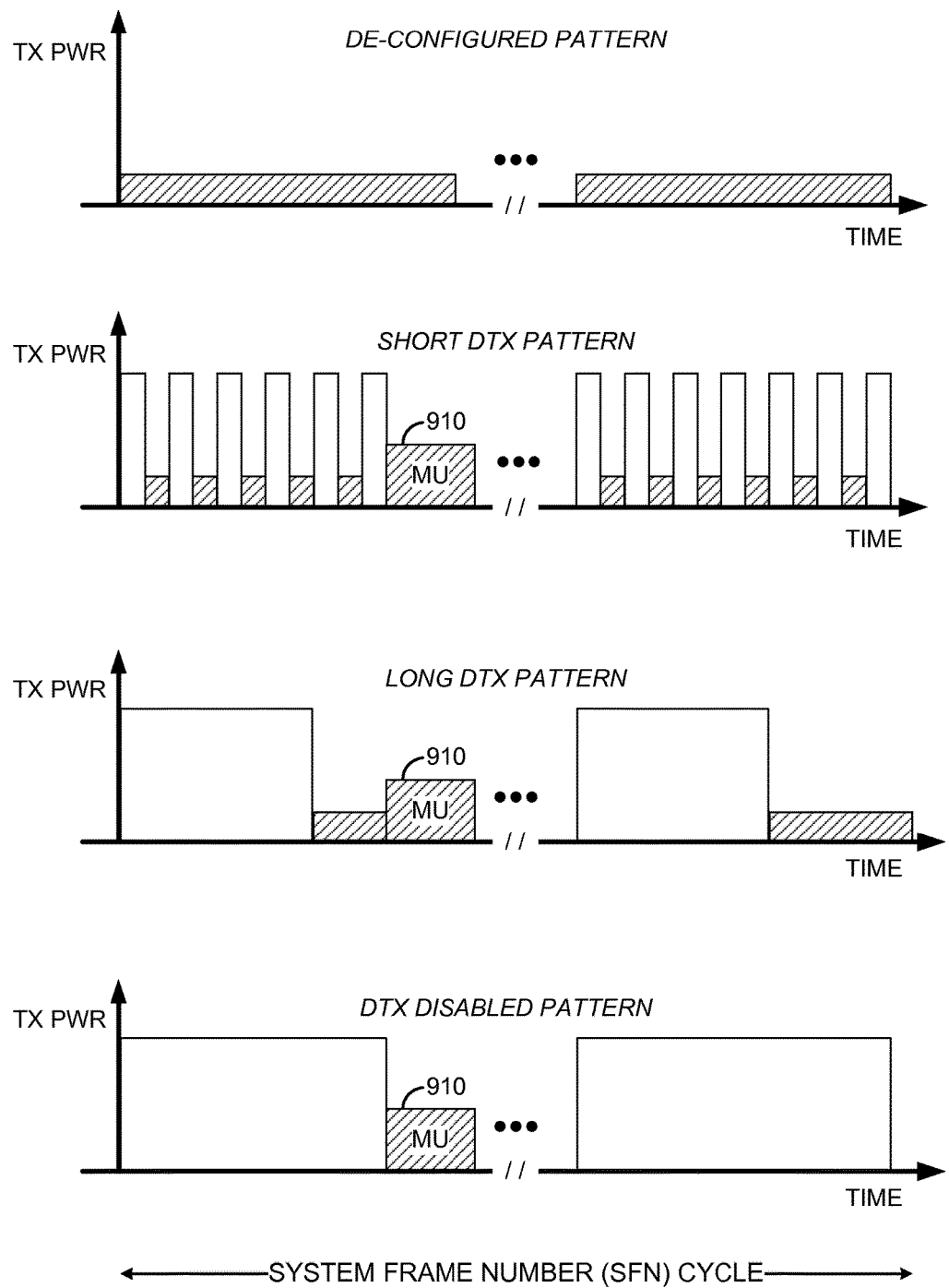
FIG. 9 illustrates an example DTX timing structure adapted to coordinate medium utilization measurement opportunities within a frame structure of the primary RAT.

FIG. 9 illustrates an example DTX timing structure adapted to coordinate medium utilization measurement opportunities within a frame structure of the primary RAT, which is again shown for illustration purposes with respect to one cycle of an LTE SFN numerology. In this example, measurement opportunities are provided for competing RAT 202 medium utilization scanning and the like, which may be used for DTX parameter adaptation as described above with reference to FIG. 3. As shown, the DTX timing structure of FIG. 4 may be modified to further include a Medium Utilization (MU) period 910 reserved for such inter-RAT utilization measurements (e.g., an 80 ms duration at the end of each long DTX cycle). During each MU period 910, the access point 110 may refrain from transmitting to allow co-channel measurements (e.g., by the secondary RAT transceiver 142).

Figure 10:
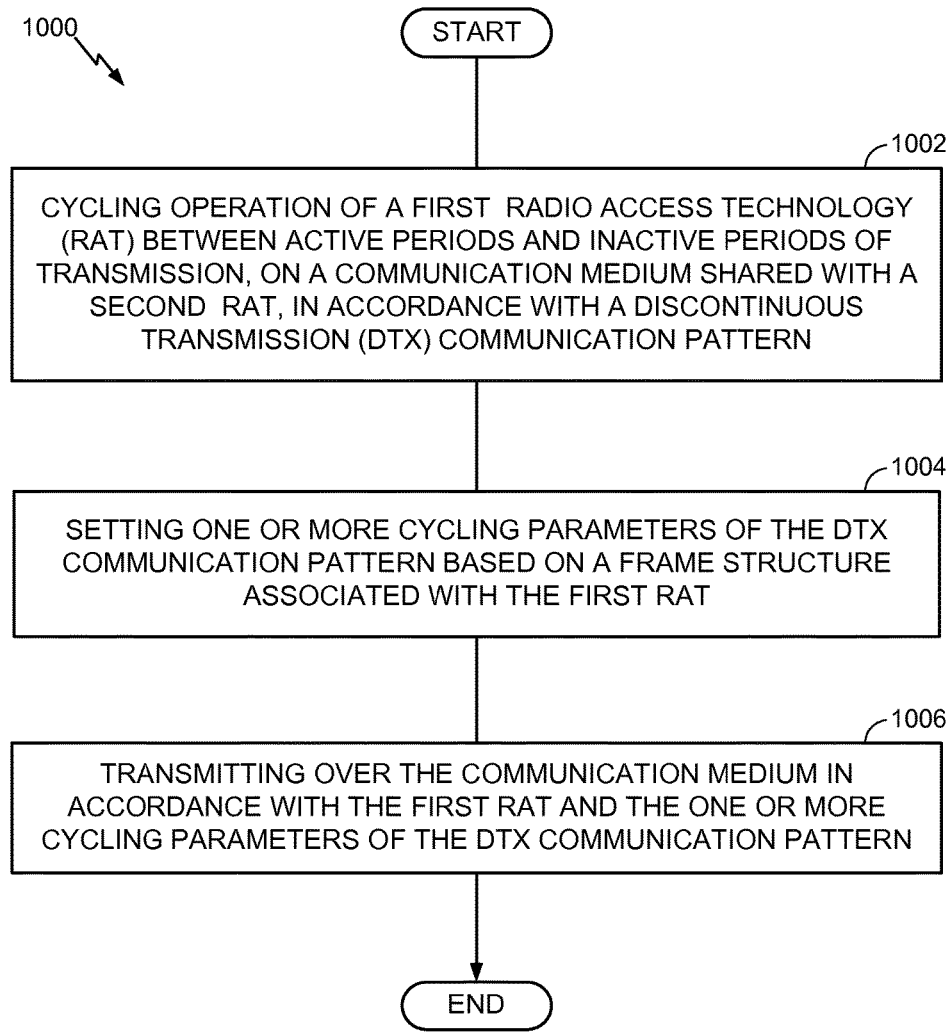
FIG. 10 is a flow diagram illustrating an example method of communication in accordance with the techniques described herein.

FIG. 10 is a flow diagram illustrating an example method of communication in accordance with the techniques described above. The method 1000 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may cycle operation of a first RAT between active periods and inactive periods of transmission, on a communication medium shared with a second RAT, in accordance with a DTX communication pattern (block 1002). The cycling may be performed, for example, by a processor and memory such as the processing system 116 and memory component 118 or the like. The access point may set one or more cycling parameters of the DTX communication pattern based on a frame structure associated with the first RAT (block 1004). The setting may be performed, for example, by a processor and memory such as the processing system 116 and memory component 118 or the like. The access point may then transmit over the communication medium in accordance with the first RAT and the one or more cycling parameters of the DTX communication pattern (block 1006). The cycling may be performed, for example, by a transceiver such as the primary RAT transceiver 140 or the like.

As discussed in more detail above, the frame structure may correspond, for example, to an LTE SFN numerology. The setting (block 1002) may include, for example, aligning one or more transition boundaries of the DTX communication pattern with one or more transition boundaries of the frame structure. In some designs, the access point may obtain the frame structure via NL scanning and synchronize one or more timing parameters for operation of the first RAT in accordance with the obtained frame structure.

As also discussed in more detail above, in some designs, the access point may reserve a measurement period for access terminal scanning based on the frame structure, the DTX communication pattern, or a combination thereof. The reserved measurement period may have, for example, a duration below a threshold and repeat once every system cycle defined by the frame structure. The reserved measurement period may also have, for example, a duration above a threshold and repeat once every two or more system cycles defined by the frame structure. Here, the access point may obtain a timing measurement via GNSS and synchronize one or more timing parameters for operation of the first RAT in accordance with the obtained timing measurement.

As also discussed in more detail above, in some designs, the access point may reserve a measurement period for second RAT scanning based on the frame structure, the DTX communication pattern, or a combination thereof. The reserved measurement period may be, for example, at the end of a system cycle defined by the frame structure.

As also discussed in more detail above, in some designs, the access point may reserve a measurement period for first RAT scanning based on the frame structure, the DTX communication pattern, or a combination thereof. The reserved measurement period may be, for example, at the beginning of a DTX cycle defined by the DTX communication pattern.

As also discussed in more detail above, in some designs, the access point may reserve a measurement period for medium utilization scanning based on the frame structure, the DTX communication pattern, or a combination thereof. The reserved measurement period may be, for example, at the end of a DTX cycle defined by the DTX communication pattern.

For convenience, the access point 110 and the access terminal 120 are shown in FIG. 1 as including various components that may be configured according to the various examples described herein. It will be appreciated, however, that the illustrated blocks may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality.

Figure 11:
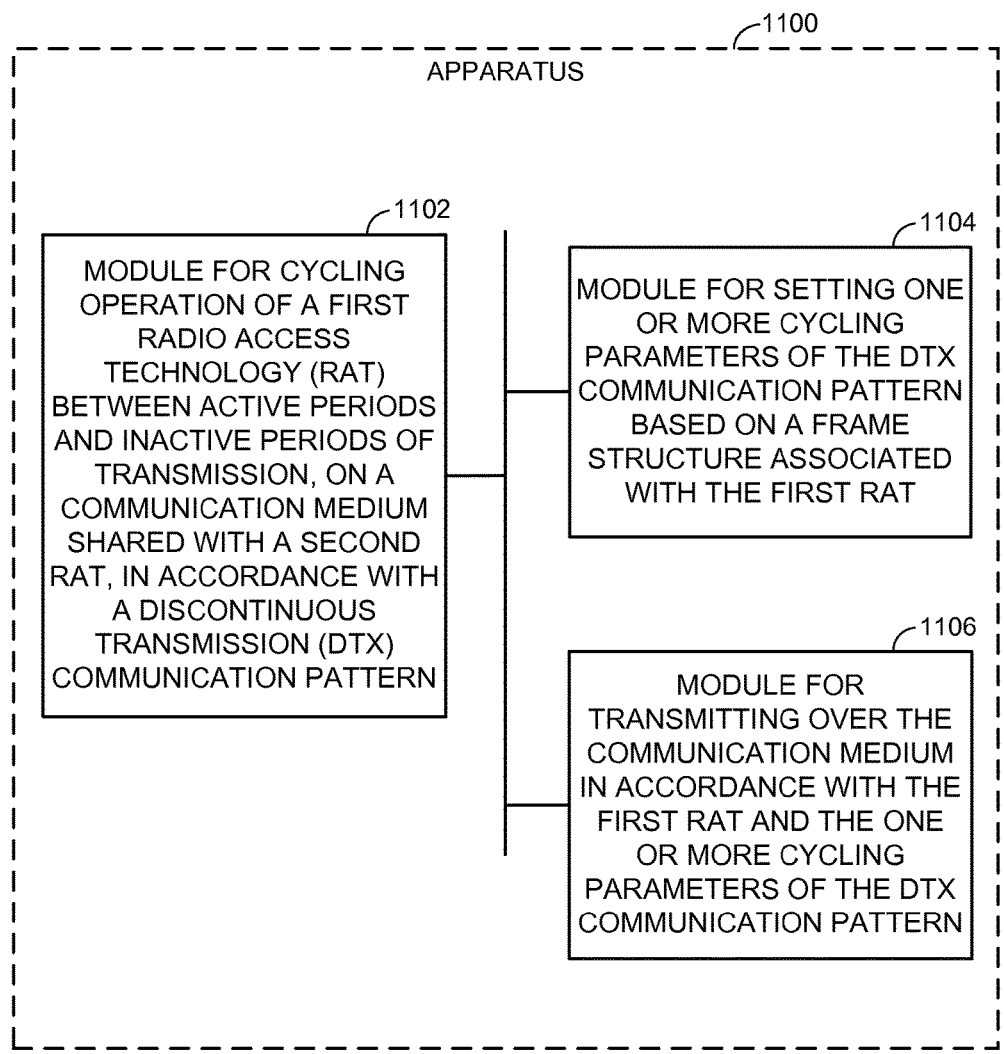
FIG. 11 illustrates an example apparatus represented as a series of interrelated functional modules.

FIG. 11 provide alternative illustrations of apparatuses for implementing the access point 110 and/or the access terminal 120 represented as a series of interrelated functional modules.

FIG. 11 illustrates an example apparatus 1100 represented as a series of interrelated functional modules. A module for cycling 1102 may correspond at least in some aspects to, for example, a communication controller or a component thereof as discussed herein (e.g., the communication controller 114 or the like). A module for setting 1104 may correspond at least in some aspects to, for example, a communication controller or a component thereof as discussed herein (e.g., the communication controller 114 or the like). A module for transmitting 1106 may correspond at least in some aspects to, for example, a communication device or a component thereof as discussed herein (e.g., the communication device 112 or the like).

The functionality of the modules of FIG. 11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 11, as well as other components and functions described herein, may be implemented using any suitable means. Such means also may be implemented, at least in part, using corresponding structure as taught herein. For example, the components described above in conjunction with the "module for" components of FIG. 11 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
cycling operation of a first Radio Access Technology (RAT) between active periods and inactive periods of transmission, on a communication medium shared with a second RAT, in accordance with a Discontinuous Transmission (DTX) communication pattern;
setting one or more cycling parameters of the DTX communication pattern based on a frame structure associated with the first RAT, the setting comprising aligning one or more transition boundaries of the DTX communication pattern with one or more transition boundaries between frames of the frame structure; and
transmitting over the communication medium in accordance with the first RAT and the one or more cycling parameters of the DTX communication pattern.

2. The method of claim 1, the frame structure corresponding to a Long Term Evolution (LTE) System Frame Number (SFN) numerology.

3. The method of claim 1, further comprising:
obtaining the frame structure via Network Listen (NL) scanning; and
synchronizing one or more timing parameters for operation of the first RAT in accordance with the obtained frame structure.

4. The method of claim 1, further comprising reserving a measurement period for access terminal scanning based on the frame structure, the DTX communication pattern, or a combination thereof.

5. The method of claim 4, the reserved measurement period having a duration below a threshold and repeating once every system cycle defined by the frame structure.

6. The method of claim 4, the reserved measurement period having a duration above a threshold and repeating once every two or more system cycles defined by the frame structure.

7. The method of claim 6, further comprising:
obtaining a timing measurement via a Global Navigation Satellite System (GNSS); and
synchronizing one or more timing parameters for operation of the first RAT in accordance with the obtained timing measurement.

8. The method of claim 1, further comprising reserving a measurement period for second RAT scanning based on the frame structure, the DTX communication pattern, or a combination thereof.

9. The method of claim 8, the reserved measurement period being at the end of a system cycle defined by the frame structure.

10. The method of claim 1, further comprising reserving a measurement period for first RAT scanning based on the frame structure, the DTX communication pattern, or a combination thereof.

11. The method of claim 10, the reserved measurement period being at the beginning of a DTX cycle defined by the DTX communication pattern.

12. The method of claim 1, further comprising reserving a measurement period for medium utilization scanning based on the frame structure, the DTX communication pattern, or a combination thereof.

13. The method of claim 12, the reserved measurement period being at the end of a DTX cycle defined by the DTX communication pattern.

14. The method of claim 1:
the medium comprising one or more time, frequency, or space resources on an unlicensed radio frequency band;
the first RAT comprising Long Term Evolution (LTE) technology; and
the second RAT comprising Wi-Fi technology.

15. A communication apparatus, comprising:
at least one processor;
at least one memory coupled to the at least one processor, the at least one processor and the at least one memory being configured to:
cycle operation of a first Radio Access Technology (RAT) between active periods and inactive periods of transmission, on a communication medium shared with a second RAT, in accordance with a Discontinuous Transmission (DTX) communication pattern, and set one or more cycling parameters of the DTX communication pattern based on a frame structure associated with the first RAT to align one or more transition boundaries of the DTX communication pattern with one or more transition boundaries between frames of the frame structure; and a transceiver configured to transmit over the communication medium in accordance with the first RAT and the one or more cycling parameters of the DTX communication pattern.

16. The apparatus of claim 15, the frame structure corresponding to a Long Term Evolution (LTE) System Frame Number (SFN) numerology.

17. The apparatus of claim 15, the at least one processor and the at least one memory being further configured to:

obtain the frame structure via Network Listen (NL) scanning; and synchronize one or more timing parameters for operation of the first RAT in accordance with the obtained frame structure.

18. The apparatus of claim 15, the at least one processor and the at least one memory being further configured to reserve a measurement period for access terminal scanning based on the frame structure, the DTX communication pattern, or a combination thereof.

19. The apparatus of claim 18, the reserved measurement period (i) having a duration below a threshold and repeating once every system cycle defined by the frame structure or (ii) having a duration above a threshold and repeating once every two or more system cycles defined by the frame structure.

20. The apparatus of claim 19, the at least one processor and the at least one memory being further configured to:

obtain a timing measurement via a Global Navigation Satellite System (GNSS); and synchronize one or more timing parameters for operation of the first RAT in accordance with the obtained timing measurement.

21. The apparatus of claim 15, the at least one processor and the at least one memory being further configured to reserve a measurement period for second RAT scanning based on the frame structure, the DTX communication pattern, or a combination thereof.

22. The apparatus of claim 21, the reserved measurement period being at the end of a system cycle defined by the frame structure.

23. The apparatus of claim 15, the at least one processor and the at least one memory being further configured to reserve a measurement period for first RAT scanning based on the frame structure, the DTX communication pattern, or a combination thereof.

24. The apparatus of claim 23, the reserved measurement period being at the beginning of a DTX cycle defined by the DTX communication pattern.

25. The apparatus of claim 15, the at least one processor and the at least one memory being further configured to reserve a measurement period for medium utilization scanning based on the frame structure, the DTX communication pattern, or a combination thereof.

26. The apparatus of claim 25, the reserved measurement period being at the end of a DTX cycle defined by the DTX communication pattern.

27. A communication apparatus, comprising:

means for cycling operation of a first Radio Access Technology (RAT) between active periods and inactive periods of transmission, on a communication medium shared with a second RAT, in accordance with a Discontinuous Transmission (DTX) communication pattern;

means for setting one or more cycling parameters of the DTX communication pattern based on a frame structure associated with the first RAT, the means for setting comprising means for aligning one or more transition boundaries of the DTX communication pattern with one or more transition boundaries between frames of the frame structure; and means for transmitting over the communication medium in accordance with the first RAT and the one or more cycling parameters of the DTX communication pattern.

28. A non-transitory computer-readable medium, comprising:

code for cycling operation of a first Radio Access Technology (RAT) between active periods and inactive periods of transmission, on a communication medium shared with a second RAT, in accordance with a Discontinuous Transmission (DTX) communication pattern;

code for setting one or more cycling parameters of the DTX communication pattern based on a frame structure associated with the first RAT, the code for setting comprising code for aligning one or more transition boundaries of the DTX communication pattern with one or more transition boundaries between frames of the frame structure; and code for transmitting over the communication medium in accordance with the first RAT and the one or more cycling parameters of the DTX communication pattern.

* * * * *